United States Patent
Akhoirshida et al.

(10) Patent No.: US 10,919,490 B1
(45) Date of Patent: Feb. 16, 2021

(54) SUSTAINED NEUTRAL OPERATION OF VEHICLES

(71) Applicant: Ford Global Technologies, LLC, Dearborn, MI (US)

(72) Inventors: Mohammed Akhoirshida, Dearborn Heights, MI (US); Yamen Taleb, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/596,608

(22) Filed: Oct. 8, 2019

(51) Int. Cl.
| | |
|---|---|
| *B60R 25/04* | (2013.01) |
| *H04W 4/80* | (2018.01) |
| *H04W 12/06* | (2021.01) |
| *B60R 25/24* | (2013.01) |
| *B60R 25/33* | (2013.01) |
| *H04B 17/318* | (2015.01) |

(52) U.S. Cl.
CPC .............. *B60R 25/04* (2013.01); *B60R 25/24* (2013.01); *B60R 25/33* (2013.01); *H04B 17/318* (2015.01); *H04W 4/80* (2018.02); *H04W 12/06* (2013.01); *B60R 2325/101* (2013.01); *B60R 2325/205* (2013.01)

(58) Field of Classification Search
CPC ......... B60R 25/04; B60R 25/33; B60R 25/24; B60R 2325/101; B60R 2325/205; H04W 12/06; H04W 4/80; H04B 17/318
See application file for complete search history.

(56) References Cited

U.S. PATENT DOCUMENTS

| | | | | |
|---|---|---|---|---|
| 2003/0162528 | A1* | 8/2003 | Juzswik | G07C 9/00182 455/411 |
| 2005/0226201 | A1* | 10/2005 | McMillin | H04W 88/04 370/348 |
| 2008/0262662 | A1* | 10/2008 | Higashi | B60R 25/209 701/2 |
| 2015/0166075 | A1* | 6/2015 | Nam | H04W 52/0238 701/2 |
| 2015/0332531 | A1* | 11/2015 | Davidsson | E05B 47/0001 70/256 |
| 2016/0198315 | A1* | 7/2016 | Sakata | H04W 4/08 370/329 |
| 2019/0031141 | A1* | 1/2019 | Lazarini | B60R 25/209 |
| 2020/0234597 | A1* | 7/2020 | Wang | H04W 4/024 |

* cited by examiner

*Primary Examiner* — Nabil H Syed
(74) *Attorney, Agent, or Firm* — Frank Lolio; Eversheds Sutherland (US) LLP (57) ABSTRACT

A computer-implemented method includes determining a connection status of a first attempted connection between a mobile device comprising a Phone-as-a-Key (PaaK) controller and a first Bluetooth Low-Energy (BLE) module of a target vehicle. The mobile device selects, based on the connection status, a relay vehicle associated with the PaaK controller and the target vehicle. The relay vehicle includes a second BLE module. The mobile device may establish a second connection between the mobile device and a second BLE module of the relay vehicle, and transmit a power mode instruction to the target vehicle via the second connection between the mobile device and the second BLE installed in the relay vehicle. The second connection enables the second BLE module to relay the power mode instruction to the target vehicle, and the power mode instruction enables the target vehicle to execute a key-on operation.

20 Claims, 4 Drawing Sheets

SUSTAINED NEUTRAL OPERATION OF VEHICLES

TECHNICAL FIELD

The present disclosure relates to Phone-as-a-Key (PaaK) systems for a vehicle, and more particularly, to ad-hoc creation of a relay network for PaaK signal transmission.

BACKGROUND

A phone-as-a-key (PaaK) system facilitates accessing functions traditionally associated with a key fob via an app executing on a smartphone. The smartphone executing the PaaK app communicates with vehicles via a wireless network. However, the vehicles are often parked in areas with poor electromagnetic characteristics that block or attenuate communication between a phone and the vehicle. Additionally, other devices that share the frequency band in the vicinity of the vehicle can cause interference. Both poor electromagnetic characteristics and interference on the frequency band can shorten the operable range of the PaaK features.

The use of a mobile device as a key is disclosed in U.S. Pat. No. 10,207,677 (hereafter "the '677 Patent"), assigned to GM Global Technology Operations LLC, which discloses an apparatus to provide a communication link between a passive entry and passive start (PEPS) system of a vehicle and a user device. The system described in the '677 Patent includes a blind rebroadcast mode in which vehicles progressively communicate a PEPS message to other vehicles until finally a desired vehicle receives the message. The '677 Patent does not include features or systems that can determine when a PaaK-enabled device is unable to transmit key-on messages due to channel congestion, identify authorized vehicles that are configured to relay encoded key-on messages to the target vehicle, and perform key-on operations using the relay vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to use a PaaK-enabled vehicle as a relay for unlocking a target vehicle using a mobile device application as a key. For example, a processor of a mobile device is configured to determine a connection status between a mobile device running a Phone-as-a-Key (PaaK) application (app), and a vehicle that is to be unlocked (referred to in embodiments below as a target vehicle). The PaaK system onboard the target vehicle may use a Bluetooth Low-Energy (BLE) module for communication between itself and the mobile device.

The mobile device may determine the connection status (e.g., determine whether the mobile device has a communication channel available to communicate unlocking instructions between the phone and the target vehicle). When the communication channel is not available or is not clear, the mobile device may select another nearby vehicle to use as a relay for transmission of the unlock signal. In one example, the relay vehicle may be owned by and/or associated with the same user, or may be otherwise associated with the mobile device. In this way, the relay vehicle may also be related to the target vehicle.

The mobile device may transmit the wireless unlocking signal using the selected relay vehicle. For example, the mobile device may transmit a power mode instruction to a first BLE module of the target vehicle via the second BLE module of the relay vehicle. The power mode instruction enables the target vehicle to execute a key-on operation that unlocks the target vehicle using the phone or other mobile device as a key, even when the device may not be directly connectable to the target vehicle BLE module.

Illustrative Embodiments

The disclosure will be described more fully hereinafter with reference to the accompanying drawings, in which exemplary embodiments of the disclosure are shown, and not intended to be limiting.

Figure 1:
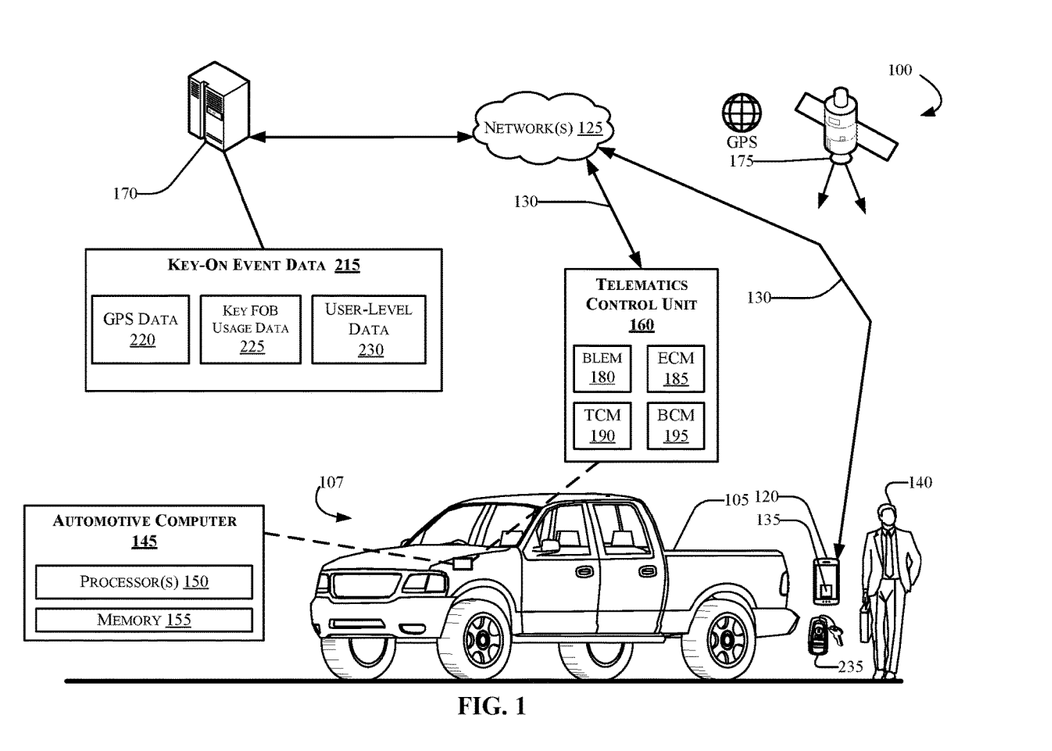
FIG. 1 depicts an example computing environment in which techniques and structures for providing the systems and methods disclosed herein may be implemented.
Figure 3:
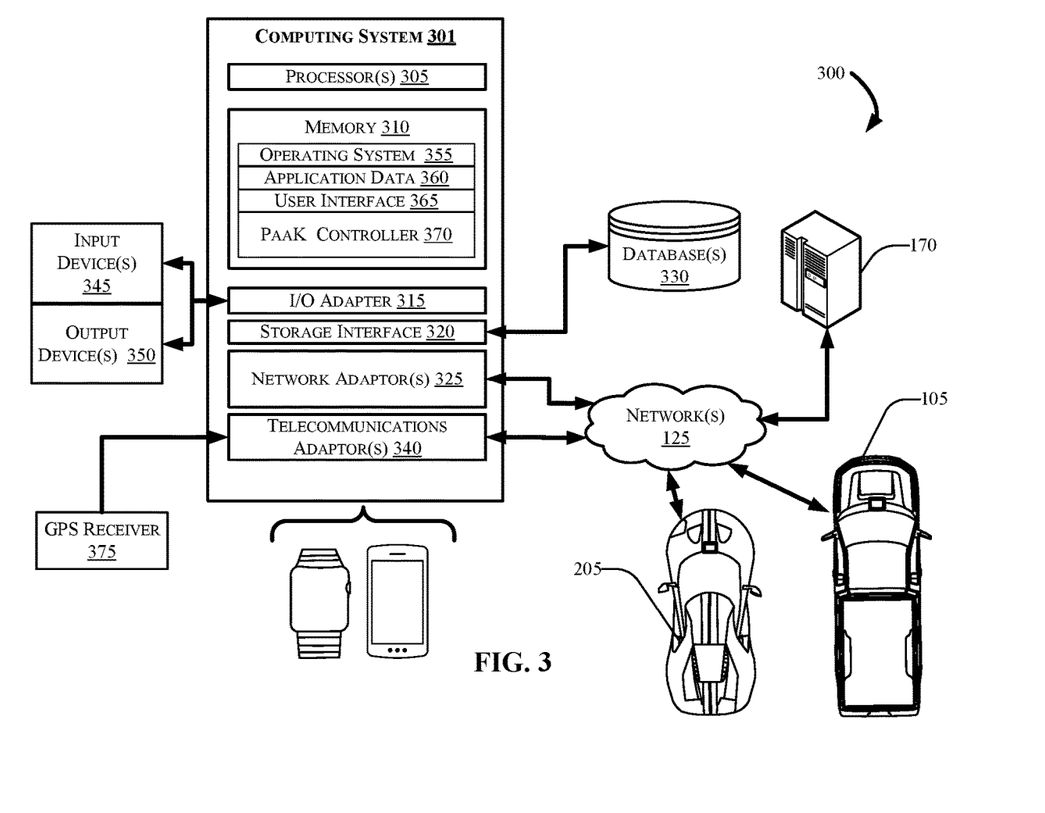
FIG. 3 illustrates a block diagram of an exemplary computing environment and computer system for use in practicing the embodiments described herein.

FIG. 1 depicts an example computing environment 100 that can include a vehicle 105, one or more server(s) 170, and a mobile device 120. The mobile device 120 may communicatively couple with the vehicle 105 and/or the server(s) 170 via one or more network(s) 125, which may transmit data using one or more wireless channel(s) 130. The mobile device 120 may include and/or be configured to execute one or more application(s) 135. The application(s) may perform information retrieval steps that provide information to the server(s) 170, which may be used to perform various steps described herein associated with controlling the vehicle 105 using a mobile device (e.g., a phone or other smart device used as a vehicle key), for authenticating a user 140 of the vehicle 105, for authenticating the mobile device 120 on which the application(s) 135 may operate, and for providing control instructions to the vehicle 105 as described according to embodiments herein. FIG. 3 (discussed in greater detail hereafter) describes a computing system 300 that may be significantly similar to and/or identical to the mobile device 120.

The vehicle 105 may include an automotive computer 145, which may include one or more processor(s) 150 and a memory 155. The vehicle 105 may further include a vehicle TCU 160, which may be disposed in communication with and/or be a part of the automotive computer 145. The vehicle TCU 160 may, in some example embodiments, communicate information to and receive communications from the mobile device 120, and/or one or more server(s) 170, which may be associated with and/or include a Telematics Service Delivery Network (SDN) (not shown in FIG. 1). The vehicle 105 may also receive and/or be disposed in communication with a Global Positioning System (GPS) 175.

Although illustrated as a truck, the vehicle 105 may take the form of any passenger or commercial vehicle such as, for example, a car, a work vehicle, a crossover vehicle, a van, a minivan, a taxi, a bus, etc. Further, the vehicle 105 may be a manually-driven vehicle, and/or be configured to operate in a fully autonomous (e.g., driverless) mode and/or partially autonomous mode, and may include any powertrain such as, for example, a gasoline engine, one or more electrically-actuated motor(s), a hybrid system, etc.

Figure 2:
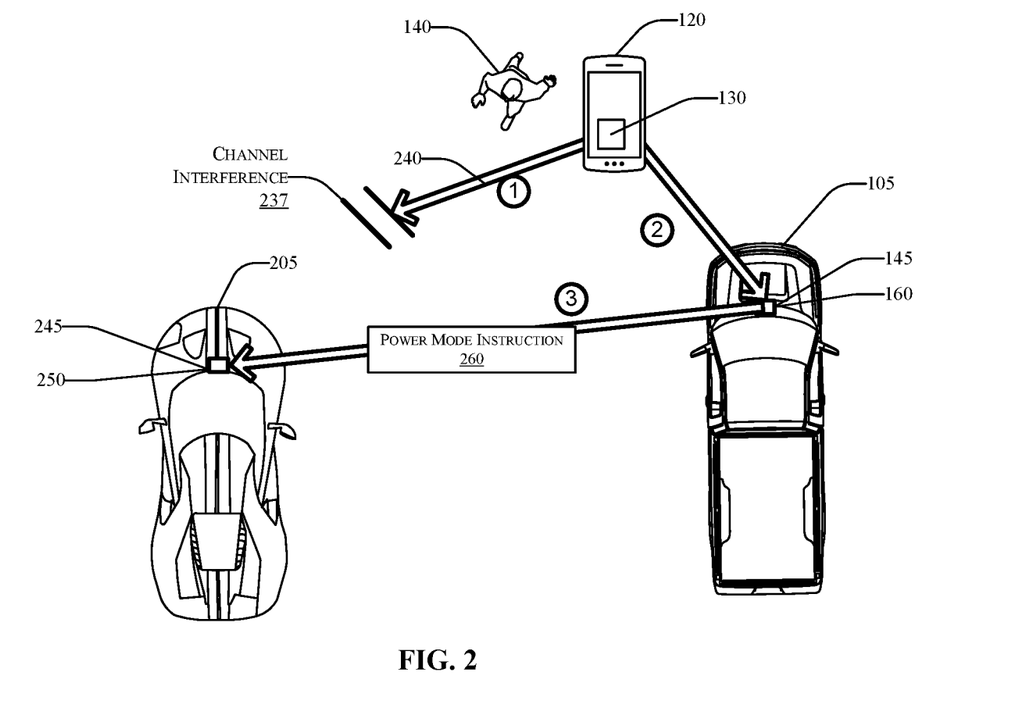
FIG. 2 illustrates an example embodiment of the present disclosure where a PaaK application operates from a mobile device to control power mode transmissions of a target vehicle using a relay vehicle according to embodiments described herein.

According to an example embodiment, a user 140 may operate and/or control one or more application(s) 135 loaded on the mobile device 120, to communicate wake-up message(s) to the vehicle TCU 160, and to communicate key-on request information that may unlock a vehicle using a PaaK system. In one aspect, the application(s) 135 may include a controller, which may operate as part of a PaaK system 107, as described in greater detail hereafter. A wakeup message may include one or more power mode instructions that are configured or programmed to control aspects of a vehicle TCU and/or an automotive computer of a vehicle. Aspects of the present disclosure reference a target vehicle (e.g., a vehicle to be unlocked) and a relay vehicle (e.g., a vehicle that may be used to relay messages between the mobile device and the target vehicle to unlock the target vehicle). The vehicle 105 is used in some examples as a relay vehicle such that the mobile device 120 uses the vehicle 105 to receive a power mode instruction and relay the instruction to the target vehicle when the mobile device is unable to connect with the target vehicle directly. As shown in FIG. 2 an example target vehicle 205 is depicted and discussed. The vehicle 105 is referred to hereafter as the relay vehicle 105.

The power mode instructions described herein may be configured or programmed to initialize one or more processors of the automotive computer for the target vehicle 205 and the relay vehicle 105. The relay vehicle 105 is shown in FIG. 1 to illustrate an example PaaK system 107, which may be substantially similar to or exactly the same as the PaaK system installed on the target vehicle 205 shown in FIG. 2. It should be appreciated that, the described aspects of the automotive computer 145 and the vehicle TCU 160 in FIG. 1 are meant to apply to the target vehicle 205 as well as the relay vehicle 105. For example, a wireless channel 130 established between the relay vehicle 105 and the mobile device 120 is similarly established between the mobile device 120 and the target vehicle 205. It should be appreciated that any or both of the vehicles 105 and 205 may be a relay vehicle and/or a target vehicle.

In some aspects, the mobile device 120 may communicate with the target vehicle 105 through the one or more wireless channel(s) 130, which may be encrypted or unencrypted channels, and established between the mobile device 120 and the vehicle TCU 160. The mobile device 120 may communicate with the vehicle TCU 160 using wireless transmitters associated with the vehicle TCU 160 on the vehicle 105. One example wireless transmitter is depicted as a BLE Module (BLEM) 180. The BLEM 180, and/or another wireless transmitter such as the telecommunications adaptor(s) 340 depicted in FIG. 3, may communicate with the mobile device 120 using a wireless communication network such as, for example, the one or more network(s) 125.

The one or more network(s) 125 illustrate one example of a communication infrastructure in which the connected device(s) depicted in the computing environment 100 may communicate. The one or more network(s) 125 may be and/or include the Internet, a private network, a public network or other configuration that operates using any one or more known communication protocols such as, for example, Transmission Control Protocol/Internet Protocol (TCP/IP), Bluetooth®, Bluetooth® Low Energy (BLE), Wi-Fi, and one or more cellular technologies such as, for example, Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle TCU 160 can provide communication and control access to a plurality of vehicle computing modules such as, for example, a Controller Area Network (CAN) bus (not shown in FIG. 1), the BLEM 180, one or more Engine Control Modules (ECMs) 185, a Transmission Control Module (TCM) 190, and/or a Body Control Module (BCM) 195. Control and/or communication with other control modules not shown is possible, and such control is contemplated. In some aspects, the vehicle TCU 160 may control aspects of the relay vehicle 105 through the control modules 180-195 and implement one or more instruction sets received from the application(s) 135 operating on the mobile device 120.

The automotive computer 145 may include one or more processor(s) 150 and a computer-readable memory 155. The automotive computer 145 may be installed in an engine compartment of the relay vehicle 105 (or elsewhere in the relay vehicle 105) as part of a PaaK system in accordance with the disclosure. The automotive computer 145 may include, in one example, the one or more processor(s) 150, and a computer-readable memory 155. In other example embodiments, the vehicle TCU 160 may be integrated with and/or be incorporated with the automotive computer 145. For the sake of simplicity, the computing system architecture of the automotive computer 145 may omit certain computing modules. It should be readily understood that the computing environment 100 depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing aspects of the present disclosure.

The memory 155 may be a non-transitory computer-readable memory. The processor(s) 150 may be configured to execute computer-executable instructions stored in the memory 155 for performing various functions of the PaaK system 107, as well as for performing vehicle control capabilities in accordance with the disclosure. Consequently, the memory 155 may be used for storing code and/or data code and/or data for performing operations in accordance with the disclosure. The memory 155 can include any one or a combination of volatile memory elements (e.g., dynamic random access memory (DRAM), synchronous dynamic random access memory (SDRAM), etc.) and can include any one or more non-volatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the vehicle TCU 160.

The memory 155 may store various code modules such as, for example, a secure communication controller (not shown in FIG. 1) for establishing the one or more wireless channel(s) 130 between the mobile device 120, the vehicle TCU 160, and/or the automotive computer 145. The secure communication controller may also be configured to encrypt messages, and determine authenticity of key-on requests (e.g., a door handle pull, unlock instruction, etc.).

The server(s) 170 may be and/or include one or more cloud computing mainframe computing platform(s) configured to store key-on event data 215 from the relay vehicle 105, the target vehicle 205, and/or other vehicles in a vehicle fleet (the fleet vehicles not shown in FIG. 1). As used herein, a key-on event may be, for example, actuation of a door latch mechanism, opening a door, starting a motor, approaching a PaaK-enabled vehicle (e.g., the vehicles 105 and 205) with a mobile device having a PaaK controller stored thereupon (e.g., the mobile device 120 having the application 135 operating on the device), and other actions that may signal to a vehicle that an authorized user wishes to access and operate the target vehicle 205 or the relay vehicle 105. Although described in this section with respect to the user 140 and the vehicles 105 and 205, it should be appreciated that the key-on event data 215 may include and/or be associated with user data from any number of users, vehicles, etc. For example, in one aspect, the server(s) 170 may also include and/or be disposed in communication with a Telematics SDN (not shown in FIG. 1), that communicates with vehicle TCUs associated with other vehicles in a vehicle fleet. Accordingly, the server(s) 170 may perform aspects of the disclosed methods, including, for example, providing GPS information associated with the target vehicle 205 and the relay vehicle 105, where the GPS information is indicative of a distance between the relay vehicle 105 and the target vehicle 205. In other aspects, the server(s) 170 may be disposed in communication with one or more of the vehicles 105 and 205, such that the server(s) 170 may also relay information such as, for example, power mode instructions that can wake up one or more of the vehicles. In one example embodiment, the server(s) 170 may provide a power mode instruction 260 as a relay intermediary to the relay vehicle 105, and the relay vehicle 105, using the BLEM 180, transmits the power mode instruction to the target vehicle 205.

The relay vehicle 105, and more particularly, the vehicle TCU 160, may transmit any one or more of the GPS data 220, key fob usage data 225, and the user-level data 230 to the server(s) 170 at predetermined intervals of time during the course of everyday vehicle usage. For example, the vehicle TCU 160 may transmit the GPS data 220 indicative of a location of the relay vehicle 105, the key fob usage data 225 indicative of vehicle 105 locking, unlocking, fob codes, fob location, and other information. This data may be received by the server(s) 170 at periodic intervals (one hour, one day, one week, etc.). The key-on event data 215 can include date information and time information associated with times that the user 140 has approached the relay vehicle 105, unlocked the relay vehicle 105, operated the relay vehicle 105, etc. These events are referred to herein, collectively, as key-on event(s), and the date, time, and other information, are referred to herein as key-on event data 215. In one embodiment, the server(s) 170 may store the key-on event data 215 as part of the PaaK system 107.

The key fob usage data 225 may include information associated with a key fob 235 that is paired with and configured to control operational aspects of the relay vehicle 105. For example, a key fob is commonly used to control locking, unlocking, arming/disarming, light control, starting, etc. Accordingly, the key fob usage data 225 may include a fob identifier (not shown in FIG. 1) that uniquely associates the key fob 235 with the user 140, the relay vehicle 105, the vehicle TCU 160, and/or the mobile device 120. In some aspects, the key fob usage data 225 may further include frequency information, signal strength information, time information, date information, GPS data, and/or other information that may be associated with determining patterns associated with the user 140 and the use of the relay vehicle 105.

According to another embodiment, calendar information, and /or other schedule information having particular dates and times of activities may be accessed by the server(s) 170 to determine the user-level data 230 associated with the user 140. Accordingly, the user-level data 230 may include schedule information associated with the user 140 that may be specific to that individual. The user-level data 230 may include, for example, calendar information associated with a digital calendar (not shown in FIG. 1), and patterns associated with the user 140, where the patterns indicate that a key-on event occurs on particular days of the week, at particular times of the day, on particular calendar days, etc.

In FIG. 2, the user 140 is depicted approaching the target vehicle 205. As the user 140 approaches the target vehicle 205, the portion of the PaaK system 107 (as shown in FIG. 1) that operates on the mobile device 120 (e.g., the application(s) 135), may attempt to transmit a power mode instruction to the target vehicle 205. In some examples, such as the embodiment depicted in FIG. 2, the channel 240 may not form a channel due to existing interference on the channel 240 (the channel interference 237). The channel interference 237 may be a physical impedance to signal transmission, such as a metal object or strong electrical current. In other aspects, the channel interference 237 may be interference on an established channel 240 between the mobile device 120 and the target vehicle 205. No matter the cause for the channel interference 237, the mobile device 120 may not successfully be able to send the power mode instruction 260 directly from the mobile device 120 to the target vehicle 205, and more particularly, to an automotive computer 245 and/or a vehicle TCU 250. The automotive computer 245 and the vehicle TCU 250 may be substantially similar or identical to the previously described automotive computer 145 and/or the vehicle TCU 160.

In one aspect, the application 135 (which includes, in the present example, a PaaK controller), may determine a connection status between the mobile device 120 and the first BLEM of the target vehicle 205. The mobile device 120 may select a relay vehicle, based on the connection status of the channel 240, and more particularly, the mobile device 120 may determine whether the channel 240 can be established between the mobile device 120 and the BLEM of the automotive computer 245 of the target vehicle 205. Responsive to determining that the channel 240 cannot transmit the power mode instruction 260 to the target vehicle 205 to initiate unlocking and other key-on operations, the mobile device 120 may transmit the power mode instruction 260 to the BLEM 180 installed in the vehicle TCU 160 of the relay vehicle 105 (shown as step 3 in FIG. 2).

The current time and location information of the user 140 approaching the target vehicle 205 may be stored in the server in addition to past data indicative of a similar pattern of vehicle use. For example, the user 140 may use the relay vehicle 105 to commute to and from work according to a recurring personal schedule where the locations for parking one or more of the vehicles 105 and 205 is predictable and stored in a database having such information (e.g., the server(s) 170 in FIG. 1). In other aspects, the locations of the vehicles 105 and 205 with respect to one another may not be predicted in every instance, and it may be beneficial to determine a distance between them to evaluate whether the BLE modules in each vehicle are within communication distance using the BLE protocols and the BLE module(s), for example the BLEM 180 as shown in FIG. 1 with respect to the relay vehicle 105, and the analogous BLEM (not shown in FIG. 2) in the TCU 250. Accordingly, the mobile device 120 may determine in a particular instance, based on a distance from the relay vehicle 105 to the target vehicle 205, that the relay vehicle 105 is within a predetermined communication radius for transmission of the power mode instruction. A predetermined radius may be, for example, within a radius of 5 meters, 6 meters, 10 meters, etc. It should be appreciated that the predetermined distance may be based on particular equipment associated with the respective vehicle TCUs, protocols used, and signal power used to transmit the signals for establishing the communication channels. Determining the distance between the vehicles 105 and 205 can be performed by the PaaK system 107 in various ways, including measuring a signal strength of a channel established between the vehicles 105 and 205, or by requesting GPS data associated with both vehicles from a central server with which both vehicles are or have been recently connected.

The mobile device 120 may transmit the power mode instruction 260 via the second connection between the mobile device 120 and the BLEM 180 (e.g., the vehicle TCU 160 of vehicle 105), where the second connection, which is depicted as an encircled "2" configures the BLEM 180 to relay the power mode instruction 260 to the target vehicle 205, and the power mode instruction 260 enables the target vehicle 205 to execute a key-on operation responsive to determining that the relay vehicle 105 is within the predetermined communication radius (not shown in FIG. 2) for transmission of the power mode instruction 260.

In this example, the user 140 may leave the relay vehicle 105 parked at an office location, most Monday mornings between 8:00 and 8:15 am, and return to the relay vehicle 105 most Mondays between 5 and 5:10 pm. Although the relay vehicle 105 may generate GPS data e.g., the GPS data 220 as shown in FIG. 1, while in a higher-power mode the vehicle GPS data indicative of the vehicle location may not be available because the relay vehicle 105 is in a low-power mode after having been parked for several hours. Thus, as the user 140 approaches the relay vehicle 105 at the end of the work day, the vehicle GPS information may not be currently accessible to determine when to transition the vehicle TCU 160 from a low-power mode to a higher-power mode, and thus, the vehicle GPS data may not be useful to the process for accessing the vehicle. Accordingly, the predicted time interval associated with a future key-on event for the relay vehicle 105 may provide this additional practical application.

In other aspects, the GPS data 220 (as shown in FIG. 1) may indicate historical position coordinates of the vehicles 105 and 205. Accordingly, the mobile device 120 may request stored GPS information associated with the target vehicle 205 from the server(s) 170, where the GPS information may be able to indicate an historic relative distance between the vehicles. This information may be used, by the mobile device 120, to determine whether to relay the power mode instruction 260 to the target vehicle 205 via the relay vehicle 105.

In some aspects, transmitting the power mode instruction 260 can include transmitting a wireless signal to a Bluetooth Low Energy (BLE) module associated with the relay vehicle 105. The power mode instruction 260 may include one or more encoded instruction(s) configured to cause the vehicle TCU 160 to change a TCU state from a low energy state to a higher energy state at the predicted time interval.

Low-energy states and higher-energy states are generally referenced herein to describe operational states associated with TCU energy consumption from an onboard power source, such as a vehicle battery or battery bank (not shown in FIG. 2). It should be appreciated that TCU systems may be designed to place a vehicle TCU in a low-energy state to allow and/or limit vehicle functionality. The low energy state may limit wireless communication between the vehicle TCU 160, the vehicle TCU 250, and other devices within communication range of the relay vehicle 105, and prevent other types of wireless communication with the vehicle TCU 250 while in the low-energy state to conserve battery power while parked for extended periods of time. One example technology for TCU power state management is described in U.S. Pat. No. 9,462,545, assigned to Ford Global Technologies LLC (hereafter "the '545 Patent," which is incorporated herein by reference). The '545 Patent describes a system that places a vehicle TCU in a sleep mode, but also activates a higher-power mode (e.g., a TCU extended power mode) to enable establishing a data session with a telecommunication network. These non-limiting examples for low-power modes and higher power modes are submitted to provide examples only, and are not intended to be limiting with respect to functionalities that may be enabled, disabled, and/or otherwise changed by altering the TCU power state.

For example, a pre-processor (not shown in FIG. 2) may, in a lower-power mode, remain active (that is, receive continuous power) maintaining clock time information, date information, etc., when in a low-power mode, while keeping the secure processor (not shown in FIG. 1) of the vehicle TCU 250 powered off or otherwise in a limited power mode. Accordingly, a pre-processor may receive one or more BLE signals from the mobile device 120 and/or from the BLEM 180 operative as part of the vehicle TCU 160, to trigger a higher energy state based on the approaching mobile device 120. The BLE signal(s) may include the power mode instructions 260 that may be configured to change the TCU state of the target vehicle 205 from the low energy state to the higher energy state.

FIG. 3 illustrates a block diagram of an exemplary computing environment 300, which may include a computer system 300 for use in practicing the embodiments described herein. The environment and system described herein can be implemented in hardware, software (e.g., firmware), or a combination thereof. The computer system 300 may be representative of one or more of the computing systems depicted with respect to FIGS. 1, 2, and 3. For example, the computing system 301 may be substantially similar or identical to the mobile device 120 as shown with respect to FIGS. 1 and 2. The computing system 301 may be a smart watch, a mobile phone, a virtual reality wearable device, or another conceivable device having processing and transmission capabilities as described herein.

With reference to the computing system 301 in FIG. 3, the computing system 301 may include the one or more processor(s) 305, a memory 310 communicatively coupled to the one or more processor(s) 305, and one or more input/output adaptors 315 that can communicatively connect with external devices such as, for example, input devices 345 and/or output devices 350. The computing system 301 may operatively connect to and communicate information with one or more internal and/or external memory devices such as, for example, one or more databases 330 via a storage interface 320. The computing system 301 may also include one or more network adaptor(s) 325 enabled to communicatively connect the computing system 301 with the network(s) 125. In one embodiment, the computing system 301 can include one or more telecommunications network(s) for communication between the computing system 301 and any external device. In such embodiments, the computing system 301 can further include one or more telecommunications adaptor(s) 340.

The one or more processor(s) 305 are collectively a hardware device for executing program instructions (aka software), stored in a computer-readable memory (e.g., the memory 310). The one or more processor(s) 305 can be a custom made or commercially-available processor, a central processing unit (CPU), a plurality of CPUs, an auxiliary processor among several other processors associated with the computing system 301, a semiconductor-based microprocessor (in the form of a microchip or chip set), or generally any device for executing instructions.

The one or more processor(s) 305 may be disposed in communication with one or more memory devices (e.g., the memory 310 and/or one or more external databases 330, etc.) via a storage interface 320. The storage interface 320 can also connect to one or more memory devices including, without limitation, one or more databases 330, and/or one or more other memory drives (not shown in FIG. 3) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 310 can include any one or a combination of volatile memory elements (e.g., dynamic random access memory (DRAM), synchronous dynamic random access memory (SDRAM), etc.) and can include any one or more non-volatile memory elements (e.g., erasable programmable read-only memory (EPROM), flash memory, electronically erasable programmable read-only memory (EEPROM), programmable read-only memory (PROM), etc.

The instructions in the memory 310 can include one or more separate programs, each of which can include an ordered listing of computer-executable instructions for implementing logical functions. In the example of FIG. 3, the instructions in the memory 310 can include an operating system 355. The operating system 355 can control the execution of other computer programs such as, for example a PaaK controller 370, and can provide scheduling, input-output control, file and data management, memory management, and communication control and related services.

The program instructions stored in the memory 310 can further include application data 360, and instructions for controlling and/or interacting with the computer through a user interface 365.

The I/O adaptor 315 can connect a plurality of input devices 345 to the computing system 301. The input devices can include, for example, a keyboard, a mouse, a microphone, a sensor, etc. The input device(s) 345 may also include one or more virtual keyboard(s) on a touchscreen interface, or another conventional input device.

The I/O adaptor 315 can also connect a plurality of output device(s) 350, which can include, for example, a display, a speaker, a touchscreen, etc. The output device(s) 350 may include one or more display adaptor(s) coupled to one or more display(s) (not shown in FIG. 3). The output devices 350 can include but are not limited to a printer, a scanner, and/or the like. Other output devices can also be included, although not shown in FIG. 3.

Finally, the I/O devices 345 and 350 that may be connectable to the I/O adaptor 315 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a BLEM, an ad-hoc networking device, a bridge, a router, etc.

According to some embodiments, the computing system 301 can include one or more telecommunications adaptor(s) 340 that may be disposed in communication with mobile telecommunications infrastructure such as, for example, mobile phone towers, satellites, vehicle-to-vehicle network infrastructure, etc. The telecommunications adaptor(s) 340 can also include and/or be disposed in communication with or more other adaptors configured to transmit and/or receive cellular, mobile, and/or other communications protocols for wireless communication. The telecommunications adaptor(s) 340 can also include and/or be disposed in communication with a global positioning system (GPS) receiver375.

Figure 4:
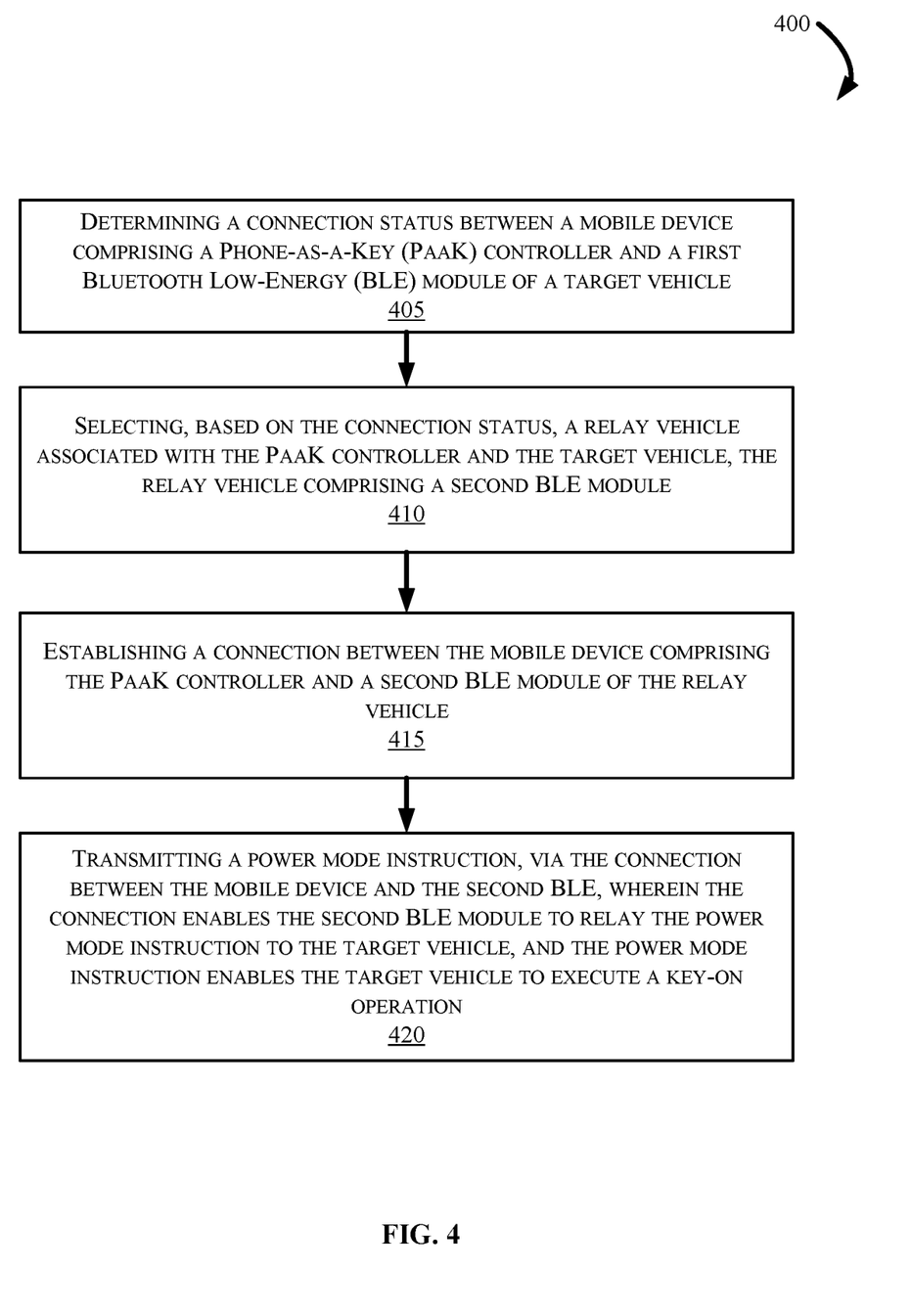
FIG. 4 depicts a flow diagram of an example method in accordance with the present disclosure.

FIG. 4 is a flowchart of an example method of the present disclosure. The method generally includes a step 405 of determining a connection status of a first connection between a mobile device comprising a Phone-as-a-Key (PaaK) controller and a first Bluetooth Low-Energy (BLE) module of a target vehicle.

Next, the method includes a step 410 of selecting, based on the connection status, a relay vehicle associated with the PaaK controller and the target vehicle, the relay vehicle comprising a second BLE module. The PaaK system can perform this step in various ways. For example, the method includes determining a distance from the relay vehicle to the target vehicle, determining, based on the distance from the relay vehicle to the target vehicle, that the relay vehicle is within a predetermined communication radius for transmission of the power mode instruction, and establishing a secure connection between the first BLE module and the second BLE module. The PaaK system may determine the distance between the relay vehicle and the target vehicle in various ways as well.

For example, the mobile device may request a signal strength value from the second BLE module installed in the relay vehicle, where the signal strength value indicates the distance from the relay vehicle to the target vehicle.

In another example, the mobile device may request the GPS information from the remote server(s) associated with the target vehicle and the relay vehicle, where the GPS information is indicative of the distance between the relay vehicle to the target vehicle, and calculate the distance between the relay vehicle to the target vehicle based on the GPS information.

The method includes a step 415 of establishing a connection between the mobile device comprising the PaaK controller and a second BLE module of the relay vehicle.

At step 420, the method may include transmitting a power mode instruction, via the connection between the mobile device and the second BLE. In some aspects, the connection configures the second BLE module to relay the power mode instruction to the target vehicle, and the power mode instruction enables the target vehicle to execute a key-on operation. In some embodiments, the power mode instruction causes the second BLE module installed in the target vehicle to change a vehicle TCU state from a low energy state to a higher energy state.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
    determining a connection status of a first attempted connection between a mobile device comprising controller and a first module of a target vehicle;
    selecting, based on the connection status, a relay vehicle associated with the controller and the target vehicle, the relay vehicle comprising a second module;
    establishing a second connection between the mobile device comprising the controller and the second module of the relay vehicle; and
    transmitting a power mode instruction, via the second connection between the mobile device and the second module, wherein the second connection enables the second module to relay the power mode instruction to the target vehicle, and the power mode instruction enables the target vehicle to execute a key-on operation.

2. The computer-implemented method according to claim 1, wherein the selecting comprises determining a distance from the relay vehicle to the target vehicle;
    determining, based on the distance from the relay vehicle to the target vehicle, that the relay vehicle is within a predetermined radius for transmission of the power mode instruction; and
    establishing a secure connection between the first module and the second module.

3. The computer-implemented method according to claim 2, wherein determining the distance from the relay vehicle to the target vehicle comprises:
    requesting, via the mobile device, a signal strength value from the first module, wherein the signal strength value indicates the distance from the relay vehicle to the target vehicle.

4. The computer-implemented method according to claim 2, wherein determining the distance from the relay vehicle to the target vehicle comprises:
    requesting, via the mobile device, Global Positioning Service (GPS) information associated with the target vehicle and the relay vehicle, where the GPS information is indicative of the distance between the relay vehicle to the target vehicle; and calculating the distance between the relay vehicle to the target vehicle based on the GPS information.

5. The computer-implemented method according to claim 1, wherein the power mode instruction causes the second module to change a vehicle Telematics Control Unit (TCU) state of the relay vehicle from a low energy state to a higher energy state.

6. The computer-implemented method according to claim 1, wherein selecting the relay vehicle associated with the controller and the target vehicle comprises:
determining a signal strength associated with the relay vehicle; and
responsive to determining that the signal strength associated with the relay vehicle comprises at least a threshold level of signal energy, authenticating the target vehicle with the controller.

7. The computer-implemented method according to claim 1, wherein transmitting the power mode instruction to the first module of the target vehicle via the second module in the relay vehicle, comprises:
transmitting the power mode instruction to a telecommunications adaptor disposed in communication with the second module via a remote server, wherein the telecommunications adaptor receives the power mode instruction through a telecommunications network;
and relaying the power mode instruction to the first module via the second module.

8. A system, comprising:
a processor; and
a memory for storing executable instructions, the processor configured to execute the instructions to:
determine a connection status between a mobile device comprising a Phone-as-a-Key (PaaK) controller and a first Bluetooth Low-Energy (BLE) module of a target vehicle;
select, based on the connection status, a relay vehicle associated with the PaaK controller and the target vehicle, the relay vehicle comprising a second BLE module; and
transmit a power mode instruction, via a second connection between the mobile device and the second BLE, wherein the second connection enables the second BLE module to relay the power mode instruction to the target vehicle, and the power mode instruction enables the target vehicle to execute a key-on operation.

9. The system according to claim 8, wherein the processor is configured to:
determine, based on a distance from the relay vehicle to the target vehicle, that the relay vehicle is within a predetermined radius for transmission of the power mode instruction; and
establish a secure connection between the first BLE module and the second BLE module responsive to determining that the relay vehicle is within the predetermined radius for transmission of the power mode instruction.

10. The system according to claim 9, wherein the processor is configured to:
request, via the mobile device, a signal strength value from the second BLE module, wherein the signal strength value indicates the distance between from the relay vehicle to the target vehicle; and
determining the distance from the relay vehicle to the target vehicle based on the signal strength value.

11. The system according to claim 8, wherein the processor is configured to:
request, via the mobile device, Global Positioning Service (GPS) information associated with the target vehicle and the relay vehicle, where the GPS information is indicative of a distance between the relay vehicle to the target vehicle; and
determine the distance between the relay vehicle to the target vehicle based on the GPS information.

12. The system according to claim 8, wherein the power mode instruction causes the second BLE module to change a vehicle Telematics Control Unit (TCU) state from a low energy state to a higher energy state.

13. The system according to claim 8, wherein the processor is configured to:
determine a signal strength associated with the relay vehicle;
responsive to determining that the signal strength associated with the relay vehicle comprises at least a threshold level of signal energy, authenticate the target vehicle with the PaaK controller; and
select the relay vehicle associated with the PaaK controller and the target vehicle responsive to authenticating the target vehicle with the PaaK controller.

14. The system according to claim 8, wherein the processor is configured to:
transmit the power mode instruction to a telecommunications adaptor disposed in communication with the second BLE module via a remote server, wherein the telecommunications adaptor receives the power mode instruction through a telecommunications network;
transmit the power mode instruction to the first BLE module of the target vehicle via the second BLE module in the relay vehicle.

15. A non-transitory computer-readable storage medium comprising instructions that, when executed by a processor, cause the processor to perform acts comprising:
determining a connection status of a first attempted connection between a mobile device comprising a Phone-as-a-Key (PaaK) controller and a first Bluetooth Low-Energy (BLE) module of a target vehicle;
selecting, based on the connection status, a relay vehicle associated with the PaaK controller and the target vehicle, the relay vehicle comprising a second BLE module;
establishing a second connection between the mobile device comprising the PaaK controller and a second BLE module of the relay vehicle; and
transmitting a power mode instruction, via the second connection between the mobile device and the second BLE, wherein the second connection enables the second BLE module to relay the power mode instruction to the target vehicle, and the power mode instruction enables the target vehicle to execute a key-on operation.

16. The non-transitory computer-readable storage medium according to claim 15, wherein the selecting comprises determining a distance from the relay vehicle to the target vehicle;
determining, based on the distance from the relay vehicle to the target vehicle, that the relay vehicle is within a predetermined radius for transmission of the power mode instruction; and
establishing a secure connection between the second BLE module and the first BLE module.

17. The non-transitory computer-readable storage medium according to claim 16, wherein determining the distance from the relay vehicle to the target vehicle comprises:

requesting, via the mobile device, a signal strength value from the second BLE module, wherein the signal strength value indicates the distance from the relay vehicle to the target vehicle.

18. The non-transitory computer-readable storage medium according to claim 16, wherein determining the distance from the relay vehicle to the target vehicle comprises:

requesting, via the mobile device, Global Positioning Service (GPS) information associated with the target vehicle and the relay vehicle, where the GPS information is indicative of a distance between the relay vehicle to the target vehicle; and calculating the distance between the relay vehicle to the target vehicle based on the GPS information.

19. The non-transitory computer-readable storage medium according to claim 15, wherein the power mode instruction causes the second BLE module to change a vehicle Telematics Control Unit (TCU) state from a low energy state to a higher energy state.

20. The non-transitory computer-readable storage medium according to claim 15, wherein selecting the relay vehicle associated with the PaaK controller and the target vehicle comprises:

determining a signal strength associated with relay vehicle; and responsive to determining that the signal strength associated with the relay vehicle comprises at least a threshold level of signal energy, authenticating the target vehicle with the PaaK controller.

\* \* \* \* \*